United States Patent [19]

Tanaka et al.

[11] 4,172,176
[45] Oct. 23, 1979

[54] MAGNETIC RECORDING MEDIUM

[75] Inventors: Toshiro Tanaka, Izumi; Toshihiko Yamada, Tagajyo; Yoshiaki Hisagen, Sendai, all of Japan

[73] Assignee: Sony Corporation, Tokyo, Japan

[21] Appl. No.: 908,359

[22] Filed: May 22, 1978

[30] Foreign Application Priority Data

Jun. 1, 1977 [JP] Japan ................................ 52/65037

[51] Int. Cl.$^2$ ............................................ H01F 10/02
[52] U.S. Cl. ................................ 428/411; 252/62.53; 252/62.54; 360/135; 360/134; 428/539; 428/900
[58] Field of Search ................ 252/62.51 R, 62.54, 252/62.55–62.64, 62.53; 428/900, 328, 928, 329, 411, 539; 427/128, 131; 360/134, 135

[56] References Cited

U.S. PATENT DOCUMENTS

| | | | |
|---|---|---|---|
| 3,505,109 | 4/1970 | Schnell et al. | 252/62.54 |
| 3,547,693 | 12/1970 | Huguenard | 252/62.54 |
| 3,625,760 | 12/1971 | Slovinsky | 428/900 |
| 3,630,772 | 12/1971 | Seidel et al. | 252/62.54 |
| 3,833,412 | 9/1974 | Akaghi et al. | 252/62.54 |
| 3,987,232 | 10/1976 | Huguenard et al. | 428/900 |

FOREIGN PATENT DOCUMENTS 1102968  2/1968  United Kingdom ................ 252/62.54

*Primary Examiner*—Stanley S. Silverman
*Attorney, Agent, or Firm*—Lewis H. Eslinger; Alvin Sinderbrand

[57] ABSTRACT

A magnetic recording medium is formed of a non-magnetic base and a magnetic layer coated thereon and which contains magnetizable particles dispersed in resinous binder and, as a lubricating agent, a 2-ethylhexanoic acid ester of a saturated alcohol having 12 to 20 carbon atoms.

19 Claims, 1 Drawing Figure

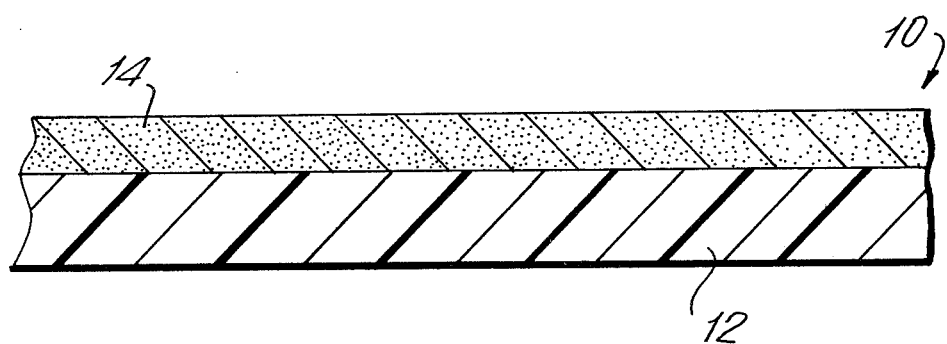

MAGNETIC RECORDING MEDIUM

BACKGROUND OF THE INVENTION

1. Field of the Invention

The present invention relates to a magnetic recording medium having a non-magnetic base and a magnetic layer coated thereon containing magnetizable particles dispersed in a resinous binder along with a lubricant.

2. Description of the Prior Art

As magnetic recording systems have been recently further developed and refined, various characteristics of the magnetic recording medium, such as the magnetic tape, magnetic sheet, magnetic disc or the like, have become increasingly important. For instance, in the case of a magnetic tape for recording a video signal, the so-called still (still picture) characteristic is of particular importance, while a so-called repeating travelling characteristic and anti-abrasion (wear resistance) characteristic are important in a magnetic tape for recording an audio signal and a magnetic tape for measuring.

Various binders, lubricants, additives and so on have been proposed to improve the above mentioned still characteristic, repeating travelling characteristic and wear-resistance characteristic. However, fully satisfactory results have not been realized. Further, it is desired to provide durable lubricant agents which do not deteriorate the electro-magnetic conversion characteristic, head wear, and viscous characteristic of paints in the form of which the magnetic layer is applied to the base. The primary functions of a lubricant are to smooth the travelling of a magnetic tape by reducing the coefficient of friction thereof when travelling at low speeds (2.4–38 cm/sec) and thereby to prevent the generation of Q-sounds and wow-flutters.

Lubricants which have been used for the magnetic layer have been exemplified as uniformly dispersed liquid substances, such as higher fatty acids (e.g. oleic acid, linoleic acid, ricinoleic acid, stearic acid, lauric acid, palmitic acid, capric acid, myristic acid, elaidic acid, stearolic acid and so on) and their fatty acid esters, one or more fatty acids of metallic salts, liquid paraffin, silicone oil, and so on, or powdered lubricating substances, such as, graphite, carbon, molybdenum disulfide, boron nitride, tungsten disulfide and powdered polytetrafluoroethylene, and mixtures thereof.

The melting point of the paraffin system and olefin system lubricants are in the range of $-5°$ C. to $50°$ C. When these lubricants are used in place of olive oil, so-called "blooming" can result and the coefficient of friction is not reduced. "Blooming" occurs when additives contained in a magnetic layer of a magnetic recording medium diffuse to the surface of the magnetic layer and deposit thereon. Considerable amounts of deposits may be found even if the additives are in a liquid phase.

When a powder lubricant is used, the proportion of the magnetic layer formed of the magnetic powders or particles is reduced. Thus, the output signal from the magnetic tape is lowered and the uniform dispersion of the magnetic powders is disturbed. This disturbance results in "tape noise". Such a disturbed magnetic layer is unsuitable for a magnetic tape for recording a short-wave signal such as a video signal.

Japanese Patent Publication No. 28367/64 by Sony Corporation discloses a lubricant comprising a fatty acid ester of a monobasic fatty acid having 12 to 16 carbon atoms and a monohydric alcohol having 3 to 12 carbon atoms. Japanese Patent Publication No. 18064/66 by Sony Corporation discloses a lubricant comprising a fatty acid ester of a monobasic fatty acid having 18 carbon atoms and a lower or moderate monohydric alcohol. Japanese Patent Publication No. 18065/66 by Sony Corporation discloses a lubricant comprising a fatty acid ester of a monobasic fatty acid having 2 to 18 carbon atoms and a monohydric alcohol having more than 14 carbon atoms. A lubricant known from Japanese Patent Publication No. 1227/67 by Sony Corporation is myristic acid ester. A lubricant also known from Japanese Patent Publication No. 669/68 by Sony Corporation is a fatty acid ester of a monohydric alcohol having 27 carbon atoms and a monobasic fatty acid. Another lubricant known from Japanese Patent Publication No. 23889/68 by Fuji Photo Film Co. is a fatty acid ester having 21 to 23 carbon atoms in a molecule formed from a monobasic fatty acid having more than 17 carbon atoms and a monohydric alcohol. Other known lubricants are fatty acid esters of unsaturated alcohols disclosed in Japanese Patent Publication No. 12950/72 by Eastman Kodak Co., fluorine-containing fatty acid esters disclosed in Japanese Patent Publication No. 15002/73 by Sony Corporation, and fatty acid esters of saturated fatty acids having 12 to 22 carbon atoms and saturated alcohols having 1 to 8 carbon atoms disclosed in Japanese Patent Publication No. 25923/73 by Tokyo Denki Kagaku Kogyo Co.

Fatty acid esters of saturated fatty acids and saturated alcohols are generally good lubricants and the lubricating effect improves as the number of carbon atoms in a molecule increases. However, as the number of carbon atoms increases, the melting point of the fatty acid ester rises resulting in the blooming phenomenon, and, therefore, such fatty acid esters are not suitable for use as lubricants in a magnetic recording medium. For this reason, fatty acid esters having a lower melting point but larger number of carbon atoms in its molecule are desired as a lubricant for magnetic recording media.

OBJECTS AND SUMMARY OF THE INVENTION

Accordingly, it is an object of the present invention to provide a magnetic recording medium which is free from blooming and has good lubricating properties, improved electromagnetic conversion characteristics and durability.

In accordance with the principles of the present invention, a magnetic recording medium is provided with a nonmagnetic base and a magnetic layer formed thereon which includes magnetizable particles dispersed in a resinous binder and a sufficient amount of lubricant to provide lubricating properties to the magnetic layer, such lubricant comprising one or more fatty acid esters produced from 2-ethylhexanoic acid and a saturated alcohol having 12 to 20 carbon atoms, the fatty acid ester or esters having a liquid phase at a temperature of no more than approximately $0°$ C.

The above, and other objects, features and advantages of the invention will be apparent in the following detailed description which is to be read in connection with the accompanying drawings.

BRIEF DESCRIPTION OF THE DRAWING

The single FIGURE schematically depicts a sectional view of a magnetic recording medium according to the invention.

DESCRIPTION OF THE PREFERRED EMBODIMENT

As generally depicted in the drawing, the present invention provides an improved magnetic recording medium 10 comprising a non-magnetic base 12 having a magnetic layer 14 thereon containing magnetic or magnetizable powders or particles dispersed in a resinous binder along with a sufficient amount of a lubricant described below.

Magnetic recording media, such as flexible magnetic recording tapes or relatively rigid magnetic recording discs, produed in accordance with the principles of the invention, exhibit superior wear-resistance characteristics, anti-blooming characteristics, heat-resistance and water-resistance relative to those of the prior art magnetic recording media.

It has been found that lubricants consisting of fatty acid esters having a melting point substantially above 0° C. often cause blooming as the environment varies and that it is preferable that the lubricant have a melting point that is less than about 0° C. However, it has also been observed that the lubricant properties improve as the number of carbon atoms increases. Generally, it has been found that certain 2-ethylhexanoic acid esters satisfy the requirements for a lubricant of a magnetic recording medium.

More particularly, lubricants suitable for use in the present invention comprise a single fatty acid ester of 2-ethylhexanoic acid and saturated alcohols having 12 to 20 carbon atoms, or a mixture of the said fatty acid esters. The ester or mixture of esters should form a liquid phase at a temperature no more than about 0° C.

Saturated alcohols which may be used to form the fatty acid esters may be exemplified as follows: lauryl alcohol (dodecyl alcohol) having 12 carbon atoms, tridecyl alcohol having 13 carbon atoms, myristyl alcohol (tetradecyl alcohol) having 14 carbon atoms, pentadecyl alcohol having 15 carbon atoms, cetyl alcohol (hexadecyl alcohol) having 16 carbon atoms, heptadecyl alcohol having 17 carbon atoms stearyl alcohol (octadecyl alcohol) having 18 carbon atoms nonadecyl alcohol having 19 carbon atoms, eicosyl alcohol (arachidic alcohol) having 20 carbon atoms, and so on.

The above described lubricants used according to the present invention, straight chain saturated alcohols are preferable to saturated alcohols having one or more branched chains because esters of straight chain saturated alcohols exhibit superior lubricating properties and have good Q-sounds, still and shuttle characteristics. However, esters of straight chain saturated alcohols have somewhat higher melting points than the esters of the branched chain saturated alcohols and can result in deterioration with respect to the blooming characteristic. While saturated alcohols with more than 20 carbon atoms contribute improved lubricating properties, the resulting esters have too high a melting point. Conversely, alcohols with less than 12 carbon atoms display poor lubricating qualities.

Generally, it is preferable that the saturated alcohol component of the ester of the lubricant have more than 10 carbon atoms. However, even decyl alcohol which has only 10 carbon atoms has a melting point of 7° C., and it is preferably esterified by a fatty acid to lower the melting point. Moreover, it is desirable to increase the number of carbon atoms of the fatty acid since better lubrication properties result. Hexanoic acid having a melting point of −3.4° C. and heptanoic acid having a melting point of −10.5° C. are known as fatty acids with melting points below 0° C. However, the heptanoic acid ester of an alcohol having more than 14 carbon atoms has a melting point of more than 0° C. which is liable to cause blooming. Accordingly, it is difficult to use the hexanoic or heptanoic acid esters of myristyl alcohol, cetyl alcohol, stearyl alcohol and arachidic alcohol, all of which otherwise exhibit good lubricating properties.

On the other hand, the above-mentioned 2-ethylhexanoic acid, which is produced by introducing an ethyl group into β-position of hexanoic acid (ethylation), has a melting point that is considerably lower than that of the hexanoic acid. As a result, the melting points of esters of the 2-ethylhexanoic acid and the above-mentioned saturated alcohols are lowered. For example, the melting point of the ester of 2-ethylhexanoic acid and cetyl alcohol is −8.1° C., and the melting point of the ester of 2-ethylhexanoic acid and stearyl alcohol is 7° C. The melting points of the esters produced by the use of lauryl alcohol and myristyl alcohol, respectively, are less than 0° C. The melting point of the ester produced by the use of arachidic alcohol is in the range of about 10° to 20° C.

It is preferable that the ester or mixture of esters used as the lubricant have a melting point of less than 0° C. as mentioned above. According to the present invention, because the melting point of 2-ethylhexanoic acid is lowered, the esters of 2-ethylhexanoic acid and cetyl alcohol, lauryl alcohol or myristyl alcohol have respective melting pionts of less than 0° C. and are each suitable for use as a lubricant in magnetic recording media.

The esters of 2-ethylhexanoic acid and stearyl alcohol or arachidic alcohol have melting points of more than 0° C. and form a solid phase approximately at 0° C. However, according to the present invention, a mixture of esters which are respectively solid and liquid at 0° C. may be used as a lubricant so that the melting point of the said mixture is about 0° C. or lower, with the result that blooming can be prevented and satisfactory lubricating properties can be expected. As a result of the mixing of both esters, the respective properties are added to each other to provide improved lubricating characteristics and the prevention of the blooming. A satisfactory lubricant can be expected when the ester of lauryl alcohol or myristyl alcohol is mixed with the ester of cetyl alcohol to form an ester mixture comprising a plurality of esters which are all in the liquid state at approximately 0° C.

When the ester of stearyl alcohol or the ester or arachidic alcohol is mixed with an ester or esters having a melting point of less than 0° C., it is preferable that the ester of stearyl alcohol is mixed in an amount of less than 40 weight percent for the total amount of the ester mixture, and that the ester of arachidic alcohol is mixed in an amount of less than 20 weight percent for the total amount of the ester mixture. If the ester which is solid at 0° C. is present in excess, the effect of liquid ester in reducing the melting point of the mixture is reduced and blooming is liable to occur.

Preferably, the lubricant according to this invention, which is constituted by one or more esters liquid at 0° C. or by a mixture of esters liquid at that temperature, is added to the magnetic layer in the proportion of 1 to 10 parts by weight (hereinafter simply called "part") to 100 parts of the resinous binder. Poor lubrication results when less than 1 part of the ester or ester mixture is added. An amount of the lubricant of more than 10 parts is excessive. An excessive amount of lubricant does not prevent blooming and results in the powders peeling off due to a deterioration of the magnetic layer strength.

Examples of the ferromagnetic material powders or magnetic particles which can be used in the magnetic layer of a magnetic medium according to the invention are $\gamma$-$Fe_2O_3$, $Fe_3O_4$, spinel-structure intermediate phase between $\gamma$-$Fe_2O_3$ and $Fe_3O_4$, Cobalt-doped $\gamma$-$Fe_2O_3$, Cobalt-doped $Fe_3O_4$, the above intermediate phase which is Cobalt-doped, chromium dioxide, barium ferrite, various alloy powders or particles (for example, Fe-Co, Co-Ni, Fe-Co-Ni, Fe-Co-B, Fe-Co-Cr-B, Mn-Bi, Mn-Al, Fe-Co-V and so on), iron nitride, and so on. Mixtures of the above powders can also be used in the invention.

The following substances examplify resinous materials which may be used as the binder in the magnetic layer of a magnetic recording medium according to the invention: vinyl chloride-vinyl acetate copolymer, vinyl chloride-vinyl acetate-maleic acid copolymer, vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-styrene copolymer, thermoplastic polyurethane resin, phenoxy resin, polyvinyl fluoride, vinylidene chloride-acrylonitrile copolymer, butadiene-acrylonitrile copolymer, acrylonitrile-butadeine-acrylic acid copolymer, acrylonitrile-butadienemethacrylic acid copolymer, polyvinyl butylal, polyvinyl acetal, cellulose derivative, styene-butadiene copolymer, polyester resin phenolic resin, epoxy resin, thermosetting polyurethane resin, urea resin, malamine resin, alkyd resin, urea formuldehyde resin and mixtures of these materials and the like. When a curing agent of polyisocyanate is used as a cross-linking agent for the binder, it is desired that the amount of the curing agent be present in an amount of 10 to 40 weight percent relative to the total amount of the binder.

As a non-magnetic base for the magnetic recording medium according to the present invention, the following materials are exemplified: polyesters such as polyethyleneterephthalate and polyethylenenaphthalate, polyolefins such as polypropylene, cellulose derivatives such as cellulosetriacetate, cellulosediacetate, polycarbonate, polyvinyl chloride, polyimide, metallic materials such as aluminum, copper and the like, paper and the like.

Upon preparing the magnetic paint for applying the magnetic coating or layer according to the present invention, the following materials are suitable as organic solvents: ketones such as acetone, methylethylketone, methylisobutylketone, cyclohexanone; alcohols such as methanol, ethanol, propanol, butanol; esters such as methyl acetate, ethyl acetate, butyl acetate, ethyl lactate, ethylene glycol acetate, monoethylether; glycol ethers such as ethylene glycoldimethylether, ethyleneglycolmonoethylether, dioxane; aromatic hydrocarbons such as benzene, toluene, xylene; aliphatic hydrocarbons such as hexane, heptane and so on; nitropropane and the like. The solvents can be used independently or in combination.

Further, an abrasive agent may be included in the magnetic layer of the magnetic recording medium according to the invention and may be selected from materials such as aluminum oxide, chromium oxide, silicon oxide, silicon carbide, and the like which may be used separately or in combination. Moreover, in the magnetic layer of the magnetic recording medium according to the invention, carbonblack may be used as an anti-static agent and lecithin may be used as a dispersion agent.

EXAMPLE 400 parts by weight of acicular magnetic powders or particles of $\gamma$-$Fe_2O_3$ [average length of a particle being $0.5\mu$ (micron) and acicular ratio being 4 to 5];
50 parts by weight of vinyl chloridevinyl acetate copolymer [weight ratio of vinyl chloride: vinyl acetate being 87:13 which is a Vinylite VYHH (Tradename of Union Carbide Co. Ltd)]; 50 parts by weight of thermoplastic polyurethane resin Estane 5701, Tradename of B. F. Goodrich Chemical Co.; 4 parts by weight of lechithin (as dispersion agent); 5 parts by weight of one of the lubricant samples identified on the following Tables I and II;
300 parts by weight of butyl acetate (as solvent);
and 300 parts by weight of toluene (as solvent)

are charged into a ball mill and mixed therein for 20 hours to produce a magnetic paint. This magnetic paint is coated on a polyethylene terephthalate film of 1 Mil (0.001 inch) up to the residual thickness of the magnetic paint, $6\mu$, surface-treated by a super calender, slit into ½ inch wide tapes and then wound on a reel as a magnetic recording medium.

Each magnetic recording medium thus manufactured is examined or tested as to its still characteristics, peeling-off characteristics, Q-sounds characteristic (that is stickslip characteristic) and shuttle characteristics by a VTR AU-3700 (Tradename) made by Sony Corporation.

More particularly, still characteristics are tested by recording a video signal of 4.3 MHz on the magnetic recording medium and measuring the time period within which the output signal therefrom is attenuated by 50% and comparing the measured value with the standard value of 50 minutes.

The peeling-off characteristics are tested by subjecting a length of the magnetic recording medium, which corresponds to a recording time of 10 minutes to repeated travel (100 times) through the VTR. The amount of the magnetic particles peeled off from the magnetic recording medium and deposited on the head, deaddrum, head guide and so on of the VTR are gathered by wiping the head, head drum, head guide and so on, and dissolving the gathered particles in an acid ($HNO_3$). Rhodanate is then dissolved therein, and the colorimetry (absorption spectrum in visible radiation) thereof is measured by the rhodan (SCN—) color development method. That is, the absorption factor based upon the absorption spectrum is plotted and compared to the previously-determined equation (or graph) for the concentration-absorption factor and then the corresponding concentration i.e. peeling-off amount of particles is determined. The determination (referred to in Table II) shows the mg (milligram) order (exponential) of the magnetic particles peeled off from the tape and deposited on members of the VTR in contact therewith.

In measuring the shuttle characteristics, the magnetic recording medium with a video signal of 4.3 MHz recorded on the length of the tape corresponding to 10 minutes of recording time is repeatedly (100 times) run through the VTR, and then the reduction of the video signal reproduced therefrom is measured. The values listed in Table III show the dB (decibel) of the output reduction of the video signal.

stantially observed, and the mark "P" indicates a poor result in that blooming is observed.

Table I

| Sample | | Component of Ester Fatty acid | Alcohol | Melting Point of Ester (°C.) | Q-sounds | Still (Minutes) | Blooming |
|---|---|---|---|---|---|---|---|
| Comparative Examples | 1 | Hexanoic acid | Capryl alcohol (n-octylalcohol) | −42 | A | >60 | G |
| | 2 | Hexanoic acid | Cetyl alcohol | — | S | >60 | P |
| | 3 | Hexanoic acid | Stearyl alcohol | — | N | >60 | P |
| | 4 | Heptanoic acid | Capryl alcohol (n-octyl alcohol) | −15 | A | >60 | G |
| | 5 | Heptanoic acid | Lauryl alcohol | −4.6 | Z | >60 | G |
| | 6 | Heptanoic acid | Myristyl alcohol | 2.0 | S | 30 to 60 | H |
| | 7 | Octanoic acid | Hexyl alcohol | — | A | >60 | G |
| | 8 | Octanoic acid | Capryl alcohol (n-octylalcohol) | — | Z | >60 | G |
| | 9 | Octanoic | Lauryl alcohol | — | S | 30 to 60 | H |
| | 10 | 2-ethylhexanoic acid | Stearyl alcohol | 7.0 | N | >60 | H |
| | 11 | 2-ethylhexanoic acid | Arachidic alcohol | 10 to 20 | N | >60 | P |
| Example of the present invention | 12 | 2-ethylhexanoic acid | Cetyl alcohol | −8.1 | N | >60 | G |

In the evaluation of Q-sound in the Tables, the letter "N" indicates that the Q-sound is not audible, the letter "S" indicates that it is scarcely audible, the letter "Z" indicates that it is audible at times and the letter "A" represents that it is audible. Further, the blooming characteristic is measured by disposing the magnetic tape in a constant temperature chamber for 20 hours at 0° C. and then for 20 hours at 35° C., and this treatment is repeated 4 times. The blooming characteristics on eleven samples are respectively shown in Table I where the mark "E" represents a very superior result in that no blooming is observed, the mark "G" indicates a good result in that blooming is scarcely observed, the mark "H" indicates only a fair result in that blooming is substantially observed, and the mark "P" indicates a poor result in that blooming is observed.

From the results shown on Table I, it will be understood that the ester of 2-ethylhexanoic acid and stearyl alcohol exhibits a very superior result as to Q-sounds but only fair results as to blooming, whereas the ester of 2-ethylhexanoic acid and cetyl alcohol exhibits balanced good results as to all the listed characteristics, that is, the Q-sounds, still and blooming characteristics.

The following Table II shows the results of samples 13 to 17 of the present invention in which the ester of 2-ethylhexanoic acid and cetyl alcohol is mixed with the ester of 2-ethylhexanoic acid and lauryl alcohol, myristyl alcohol, stearyl alcohol or arachidic alcohol. Table II also shows the results of comparative samples 18 and 19 and of samples 20 and 21 using conventional lubricants.

Table II

| Sample | | Component of Lubricant | Q-sounds | Still (Minutes) | Peeling-off of powders | Shuttle | Blooming |
|---|---|---|---|---|---|---|---|
| Examples of the present invention | 13 | Ester of cetyl alcohol, 95%; Ester of arachidic alcohol, 5% | N | >60 | −2.0 | −2 | G |
| | 14 | Ester of cetyl alcohol, 80%; Ester of stearyl alcohol, 20% | N | >60 | −2.0 | −2 | G |
| | 15 | Ester of cetyl alcohol, 50%; Ester of stearyl alcohol, 50% | S | >60 | −1.0 | −2 | G |
| | 16 | Ester of cetyl alcohol, 50%; Ester of myristyl alcohol, 50% | S | >60 | −1.0 | −2 | G |
| | 17 | Ester of cetyl alcohol, 50%; Ester of lauryl alcohol, 50% | S | >60 | −1.0 | −1.5 | G |
| Comparative examples | 18 | Ester of capryl alcohol (n-octyl alcohol), 100% | Z | >60 | −1.0 | −1.5 | G |
| | 19 | Ester of hexyl alcohol, 100% | A | >60 | −0.5 | −1.5 | G |
| Conventional ex- | 20 | Silicone oil (polydimethyl-siloxane), liquid | S | <10 | −3 | −2 to −3 | G |
| tional ex- | 21 | Ester of oleic acid and | | | | | |

Table II-continued

| Sample | Component of Lubricant | Q-sounds | Still (Minutes) | Peeling-off of powders | Shuttle | Blooming |
|---|---|---|---|---|---|---|
| amples | stearyl alcohol | S | >60 | −3 | −2 | P |

The results of Table II show that when the 2-ethylhexanoic acid ester of stearyl alcohol or arachidic alcohol having a melting point of more than 0° C. is mixed with the 2-ethylhexanoic acid ester of cetyl alcohol, an additive property is obtained from the mixing of these esters so that the blooming is not liable to occur and the Q-sounds characteristic is highly improved. It was also found preferable to limit the amount of the ester of stearyl alcohol in the mixture to less than 40% and to limit the amount of the ester of arachidic alcohol in the mixture to less than 20%, each being admixed with an ester having a melting point of 0° C. or less than 0° C.

The following Table III shows characteristics of the magnetic tape samples 22–31 according to this invention which employ additional amounts of the lubricants per 100 parts by weight of resinous binder, as compared with the earlier samples 12–17 of the invention.

Table III

| Sample | Ester forming lubricant | Addition amount (part by weight) | Q-sounds | Still | Peeling-off of powders | Shuttle |
|---|---|---|---|---|---|---|
| 22 | Ester mixture comprising esters of 2-ethylhexanoic acid and cetyl alcohol (80%) and stearyl alcohol (20%) | 0.5 | A | clog* | −1.0 | −2 |
| 23 | " | 1 | S | >60 | −1.0 | −2 |
| 24 | " | 5 | N | >>60 | −2.0 | −2 |
| 25 | " | 10 | N | >>60 | −2.0 | −2 |
| 26 | " | 20 | N | >60 | −4 | −3 |
| 27 | Ester mixture comprising esters of 2-ethylhexanoic acid and cetyl alcohol (50%) and lauryl alcohol (50%) | 0.5 | A | clog* | −1 | −2 |
| 28 | " | 1 | Z | >>60 | −1 | −1.5 |
| 29 | " | 5 | S | >>60 | −1 | −1.5 |
| 30 | " | 10 | S | >>60 | −2 | −2 |
| 31 | " | 20 | A | >60 | −4 | −3 |

*"clog" means a phenomenon that a magnetic layer coated on a base sticks on a magnetic head during a tape travelling and a still operation.

From the results appearing on Table III, it will be seen that the amount of the ester having the lesser number of carbon atoms can be increased without deleterious results, however, the Q-sounds characteristics deteriorates and blooming is liable to occur upon increasing the amount of the ester having the larger number of carbon atoms. Accordingly, it is desirable that the amount of the ester added according to this invention be 1 to 10 parts by weight for each 100 parts of binder.

It will be evident that various modifications can be made to the described embodiments without departing from the scope of the present invention.

What is claimed is:

1. A magnetic recording medium comprising:
a non-magnetic base; and
a magnetic layer on said base formed of a resinous binder containing magnetizable particles and a lubricant consisting of at least one 2-ethylhexanoic acid ester of a saturated alcohol having 12 to 20 carbon atoms, said lubricant having a melting point of less than about 0° C.

2. A magnetic recording medium according to claim 1; wherein said lubricant is present in an amount of 1 to 10 parts by weight for 100 parts by weight of the binder.

3. A magnetic recording medium according to claim 1; wherein said saturated alcohol is a straight chain alcohol.

4. A magnetic recording medium according to claim 1; wherein said saturated alcohol is selected from the group consisting of lauryl alcohol, tridecyl alcohol, myristyl alcohol, pentadecyl alcohol, cetyl alcohol, heptadecyl alcohol, stearyl alcohol, nonadecyl alcohol and arachidic alcohol.

5. A magnetic recording medium according to claim 1; wherein said saturated alcohol is cetyl alcohol.

6. A magnetic recording medium according to claim 1; wherein the magnetizable particles are selected from the group consisting of $\gamma$-$Fe_2O_3$, $Fe_3O_4$, spinel-structure intermediate phase between $\gamma$-$Fe_2O_3$ and $Fe_3O_4$, Cobalt-doped $\gamma$-$Fe_2O_3$, Cobalt-doped $Fe_3O_4$, said intermediate phase which is Cobalt-doped, chromium dioxide, barium ferrite, alloy powders of Fe-Co, Co-Ni, Fe-Co-Ni, Fe-Co-B, Fe-Co-Cr-B, Mn-Bi, Mn-Al, Fe-Co-V, iron nitride and mixtures thereof.

7. A magnetic recording medium according to claim 1; wherein said lubricant is a mixture of at least two 2-ethylhexanoic acid esters of saturated alcohols having 12 to 20 carbon atoms and said mixture has a melting point of less than about 0° C.

8. A magnetic recording medium according to claim 7; in which one of said 2-ethylhexanoic acid esters has a melting point higher than 0° C. and is present in said mixture in a minor proportion, and another of said 2-ethylhexanoic acid esters has a melting point lower than 0° C.

9. A magnetic recording medium according to claim 8; in which said one 2-ethylhexanoic acid ester is the ester of stearyl alcohol and constitutes 40% of said mixture.

10. A magnetic recording medium according to claim 5; in which said one 2-ethylhexanoic acid ester is the ester of arachidic alcohol and constitues 20% of said mixture.

11. A magnetic coating for a recording medium comprising a resinous binder containing magnetizable particles and a lubricant consisting of at least one 2-ethylhexanoic acid ester of a saturaed alcohol having 12 to 20 carbon atoms, said lubricant having a melting point less than about 0° C.

12. A magnetic coating according to claim 11; in which said lubricant is present in an amount of 1 to 10 parts by weight for each 100 parts by weight of the binder.

13. A magnetic coating according to claim 11; in which the saturated alcohol is a straight chain alcohol.

14. A magnetic coating according to claim 11; in which said lubricant is a mixture of at least two 2-ethylhexanoic acid esters of said saturated alcohols having 12 to 20 carbon atoms and said mixture has a melting point of less than about 0° C.

15. A magnetic coating according to claim 14; in which one of said 2-ethylhexanoic acid esters has a melting point higher than 0° C. and is present in said mixture in a minor proportion, and another of said 2-ethylhexanoic acid esters has a melting point lower than 0° C.

16. A magnetic coating according to claim 11; wherein the saturated alcohol is selected from the group consisting of lauryl alcohol, tridecyl alcohol, myristyl alcohol, pentadecyl alcohol, cetyl alcohol, heptadecyl alcohol, stearyl alcohol, nonadecyl alcohol and arachidic alcohol.

17. A magnetic coating according to claim 11; wherein the magnetizable particles are selected from the group consisting of $\gamma$-$Fe_2O_3$, $Fe_3O_4$, spinel-structure intermediate phase between $\gamma$-$Fe_2O_4$ and $Fe_3O_4$, Cobalt-doped $\gamma$-$Fe_2O_3$, Cobalt-doped $Fe_3O_4$, said intermediate phase which is Cobalt-doped, chromium dioxide, barium ferrite, alloy powders of Fe-Co, Co-Ni, Fe-Co-Ni, Fe-Co-B, Fe-Co-Cr-B, Mn-Bi, Mn-Al, Fe-Co-V, iron nitride or mixtures thereof.

18. A magnetic recording medium comprising: a nonmagnetic base; and
a magnetic layer on said base formed of a resinous binder containing magnetizable particles and a lubricant having a melting point of less than 0° C. and being present in an amount of 1 to 10 parts by weight of said lubricant for 100 parts by weight of said binder, said lubricant consisting of at least one 2-ethylhexanoic acid ester of a saturated alcohol having 12 to 20 carbon atoms, with at least 50 weight percent of said lubricant being 2-ethylhexanoic acid ester of cetyl alcohol.

19. A magnetic coating for a recording medium comprising a resinous binder containing magnetizable particles and a lubricant having a melting point of less than 0° C. and being present in an amount of 1 to 10 parts by weight of said lubricant for 100 parts by weight of said binder, said lubricant consisting of at least one 2-ethylhexanoic acid ester of a saturated alcohol having 12 to 20 carbon atoms, with at least 50 weight percent of said lubricant being 2-ethylhexanoic acid ester of cetyl alcohol.

* * * * *